(12) United States Patent
Kuehner et al.

(10) Patent No.: US 11,787,429 B2
(45) Date of Patent: Oct. 17, 2023

(54) VEHICLE SNEEZE CONTROL SYSTEM AND METHOD

(71) Applicant: Toyota Research Institute, Inc., Los Altos, CA (US)

(72) Inventors: Manuel Ludwig Kuehner, Mountain View, CA (US); Hiroshi Yasuda, San Francisco, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 178 days.

(21) Appl. No.: 17/241,817

(22) Filed: Apr. 27, 2021

(65) Prior Publication Data

US 2022/0340155 A1    Oct. 27, 2022

(51) Int. Cl.
*B60W 50/08* (2020.01)
*B60W 40/08* (2012.01)
(Continued)

(52) U.S. Cl.
CPC .......... *B60W 50/082* (2013.01); *B60W 10/04* (2013.01); *B60W 10/18* (2013.01); *B60W 10/20* (2013.01); *B60W 40/08* (2013.01); *B60W 2420/42* (2013.01); *B60W 2540/18* (2013.01); *B60W 2540/21* (2020.02);
(Continued)

(58) Field of Classification Search
CPC ...... B60W 10/04; B60W 10/18; B60W 10/20; B60W 2420/42; B60W 2540/18; B60W 2540/21; B60W 2540/221; B60W 2540/223; B60W 2554/4041; B60W 2555/20; B60W 2720/10; B60W 2720/12; B60W 40/08; B60W 50/082; B60W 2040/0872; B60W 2050/0095; B60W 2420/10; B60W 2420/54; B60W 2540/00; B60W 2540/26; B60W 2900/00; B60W 30/10; B60W 30/143; B60W 30/18163; B60W 40/02; B60W 50/087;
(Continued)

(56) References Cited

U.S. PATENT DOCUMENTS 9,187,092 B2 *  11/2015  Inoue ................ B62D 1/286
9,205,842 B1 *  12/2015  Fields ................ B60W 40/08
(Continued)

FOREIGN PATENT DOCUMENTS

DE   102016005647 A1 *  2/2017
DE   102017208347 A1 *  11/2018

OTHER PUBLICATIONS

"The Sneeze", (YouTube Video), SA Health, Government of South Australia, Apr. 8, 2009 URL: https://www.youtube.com/watch?v=qKiQA5e-fPg (last accessed Apr. 21, 2021).
(Continued)

*Primary Examiner* — Babar Sarwar
(74) *Attorney, Agent, or Firm* — Christopher G. Darrow; Darrow Mustafa PC

(57) ABSTRACT

Systems, methods, and other embodiments described herein relate to controlling a vehicle system when the vehicle system is under control of a user. In one embodiment, a method includes predicting a start of a user sneezing episode. The method includes identifying a plurality of phases in the user sneezing episode, and controlling the vehicle system based on which one of the plurality of phases is active.

20 Claims, 4 Drawing Sheets

(51) Int. Cl.
 B60W 10/04 (2006.01)
 B60W 10/18 (2012.01)
 B60W 10/20 (2006.01)
(52) U.S. Cl.
 CPC .......... B60W 2540/223 (2020.02); B60W 2554/4041 (2020.02); B60W 2555/20 (2020.02); B60W 2720/10 (2013.01); B60W 2720/12 (2013.01)
(58) Field of Classification Search
 CPC .......... B60W 60/0015; B60W 60/0051; B60K 28/06; G05D 1/0088
 See application file for complete search history.

(56) References Cited

U.S. PATENT DOCUMENTS

| | | | | |
|---|---|---|---|---|
| 11,091,168 | B2* | 8/2021 | Chou | B60W 50/0098 |
| 2011/0083259 | A1* | 4/2011 | Wright | A41D 13/1192 |
| | | | | 206/524.1 |
| 2018/0364708 | A1* | 12/2018 | Losh | B60W 40/08 |
| 2019/0176837 | A1* | 6/2019 | Williams | G06F 3/165 |
| 2020/0070848 | A1* | 3/2020 | Ozer | B60K 28/06 |
| 2021/0074287 | A1* | 3/2021 | Senmyo | G06V 20/597 |
| 2021/0253110 | A1* | 8/2021 | Iwase | B60W 40/08 |
| 2021/0253111 | A1* | 8/2021 | Iwase | B60W 40/08 |
| 2022/0363264 | A1* | 11/2022 | Bilal | B60W 40/08 |

OTHER PUBLICATIONS

Seijo-Martinez, M. et al., "Sneeze related area in the medulla: localisation of the human sneezing centre?" Journal of Neurology, Neurosurgery & Psychiatry 77.4 (2006) pp. 559-561.

Moyer, J.W., "When sneezing kills", Jun. 18, 2014. URL: https://www.washingtonpost.com/news/morning-mix/wp/2014/06/18/when-sneezing-kills/ (last accessed Apr. 21, 2021).

Audi AG, "Dynamic steering," (2011). URL: https://www.audi-technology-portal.de/en/chassis/wheel-suspension-steering/dynamic-steering (last accessed Apr. 21, 2021).

* cited by examiner

VEHICLE SNEEZE CONTROL SYSTEM AND METHOD

TECHNICAL FIELD

The subject matter described herein relates, in general, to systems and methods for controlling a vehicle system when the vehicle system is under control of a user.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some vehicles are equipped with one or more driver assistance systems and/or can be operated in an autonomous or semi-autonomous mode. The driver assistance systems can be manually activated or deactivated by a user. Similarly, the user can manually select between an autonomous mode, a semi-autonomous mode, and a non-autonomous mode.

SUMMARY

This section generally summarizes the disclosure and is not a comprehensive explanation of its full scope or all its features.

In one embodiment, a method for controlling a vehicle system when the vehicle system is under control of a user is disclosed. The method includes predicting a start of a user sneezing episode. The method includes identifying a plurality of phases in the user sneezing episode and controlling the vehicle system based on which one of the plurality of phases is active.

In another embodiment, a system for controlling a vehicle system when the vehicle system is under control of a user is disclosed. The system includes a processor and a memory in communication with the processor. The memory stores a prediction module including instructions that, when executed by the processor, cause the processor to predict a start of a user sneezing episode. The memory stores a phase identification module including instructions that, when executed by the processor, cause the processor to identify a plurality of phases in the user sneezing episode. The memory stores a vehicle system control module including instructions that, when executed by the processor, cause the processor to control the vehicle system based on which one of the plurality of phases is active.

In another embodiment, a non-transitory computer-readable medium for controlling a vehicle system when the vehicle system is under control of a user and including instructions that, when executed by a processor, cause the processor to perform one or more functions, is disclosed. The instructions include instructions to predict a start of a user sneezing episode, identify a plurality of phases in the user sneezing episode, and control the vehicle system based on which one of the plurality of phases is active.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
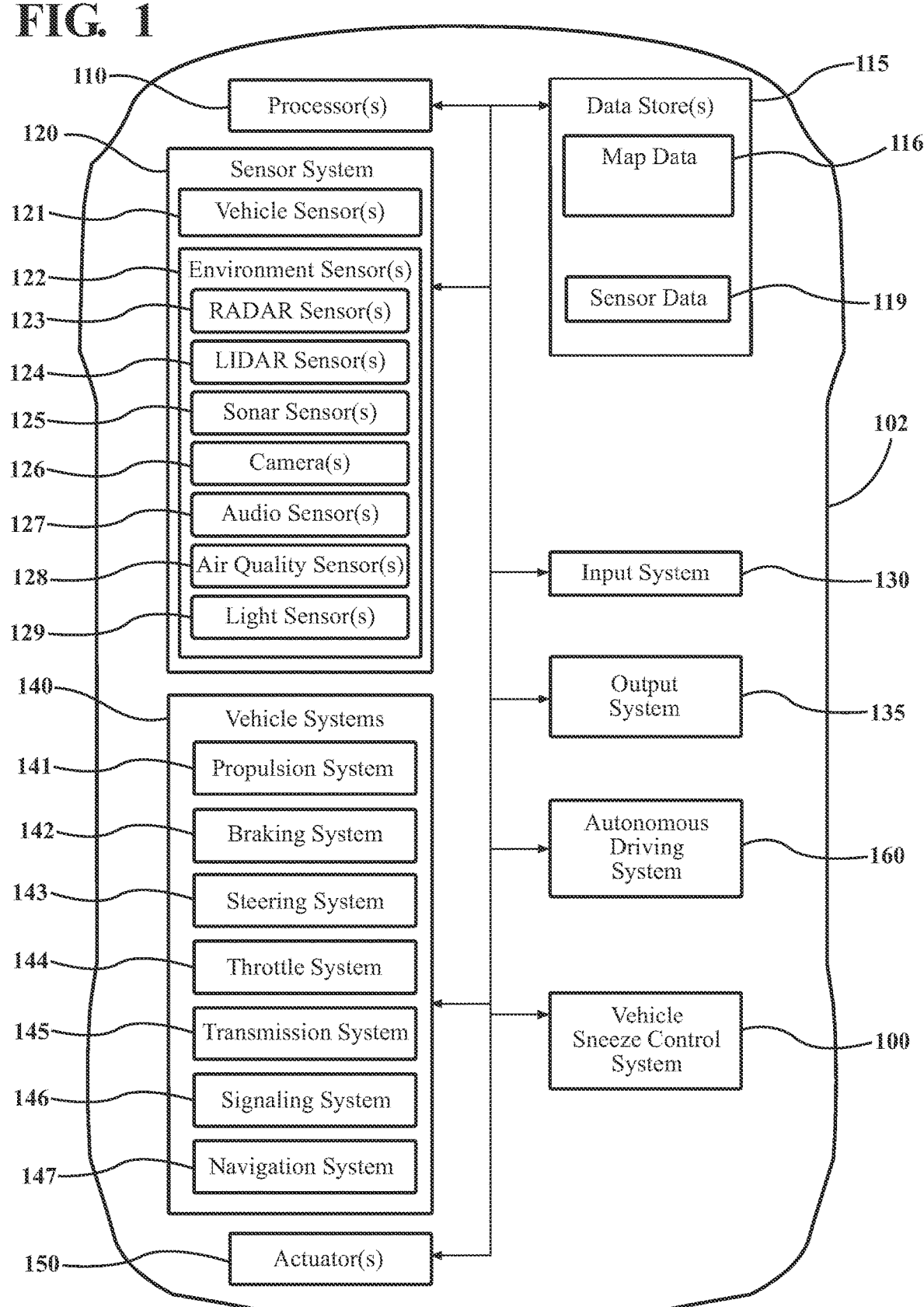
FIG. 1 illustrates a block diagram of a vehicle incorporating a vehicle sneeze control system.

Systems, methods, and other embodiments associated with controlling a vehicle system when the vehicle system is under control of a user, are disclosed. A user that sneezes while operating a vehicle may be unable to control the vehicle or may make an unintentional movement during the sneeze, which can endanger the user and other road users. Accordingly, in one embodiment, the disclosed approach is a vehicle sneeze control system that controls a vehicle system when the vehicle system is under the control of a user and the user sneezes. The vehicle sneeze control system can assist a user to maintain smooth operation of the vehicle during a user sneezing episode.

The vehicle can include one or more vehicle systems such as a steering system, a throttle system, and a braking system. The vehicle system can have an input unit for human-machine interaction, a functional unit, and a mechanism that allows a variable translation ratio between the input unit and the functional unit. The mechanism can be an electrical, electronic, or electromechanical system. As an example, the steering system can have a mechanism that allows a variable translation ratio between the steering wheel and the steering rack such as a steer-by-wire system. As another example, the throttle system can have a mechanism that electronically connects the accelerator pedal to the throttle such as a throttle-by-wire system or a gas-by-wire system. The throttle system refers to an input system to control vehicle speed and acceleration. As another example, the braking system can have an electrical mechanism between the brake pedal and the brake actuator such as a brake-by-wire system. In one embodiment, the input unit of the vehicle system can be mechanically decoupled from the functional unit of the vehicle system.

The vehicle can include one or more driver assistance systems such as a lane keeping system and a collision avoidance system. The vehicle may be operable in an autonomous mode, a semi-autonomous mode, and/or a manual mode.

The vehicle can include one or more sensors. The sensors can be located inside the vehicle such as in the vehicle cabin, and/or outside the vehicle. The sensors can include a camera that can monitor the user, the actions of the user, and the facial expressions of the user. The sensors can include a microphone that can detect sounds inside the vehicle such as sounds made by the user. The sensors can include an air quality detector that determines the level of allergens such as pollen, dust, animal fur in the air. The sensors can include a light level detector that can determine whether the light level is bright enough to trigger sneezing.

As an example, the vehicle sneeze control system can receive sensor data from the sensor(s). Based on the visual cues and/or the audio cues in the sensor data, the vehicle sneeze control system can determine whether the user is about to sneeze, i.e., start a user sneezing episode. The vehicle sneeze control system can also consider the environmental condition(s) such as allergen levels and/or light levels, when predicting the start of the user sneezing episode. As an example, the vehicle sneeze control system may use the environmental condition(s) to determine a confidence level in the prediction of the start of the user sneezing episode.

In a case where the vehicle sneeze control system predicts the start of the user sneezing episode, the vehicle sneeze control system can use the visual cues and/or audio cues to determine a plurality of phases in the user sneezing episode that are based on a sneeze reflex. The sneeze reflex has two phases: an initial spasmodic inspiratory phase followed by an oral and nasal expiratory phase. As an example, the vehicle sneeze control system can determine a spasmodic inspiratory phase, a nasal and oral expiratory phase, a waiting phase, and a normal phase. One or more of the phases can have a zero time period.

The vehicle sneeze control system can determine which vehicle system, driver assistance system, and/or driving mode to operate based on the phase that is active and one or more of vehicle speed, vehicle location, relative location of the vehicle, hand-wheel position, hand-wheel rotation speed, an object adjacent to the vehicle, and confidence in predicting the user sneezing episode. The vehicle sneeze control system can control the vehicle in a first mode for one of the phases and control the vehicle in a second mode for another of the phases. The first and second modes can differ in terms of function, intensity, and length of time. As an example, a difference in function can be adjusting the translation ratio between the steering wheel and the steering rack to two different values, a difference in intensity can be adjusting the aggressive parameter for the lane centering system, a difference in time can be two different response times between the input unit and the functional unit of the vehicle system. The vehicle sneeze control system can use any suitable algorithm to determine which mode to select and which vehicle system, driver assistance system, and/or driving mode to operate.

As an example, the vehicle sneeze control system can activate the lane keeping system in the inspiratory phase, activate the autonomous mode in the expiratory phase, maintain the lane keeping system in the activated state and the vehicle in the autonomous mode in the waiting phase, and then deactivate the lane keeping system and the autonomous mode in the normal phase.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, a block diagram of a vehicle 102 incorporating a vehicle sneeze control system 100 is illustrated. The vehicle 102 includes various elements. It will be understood that in various embodiments, it may not be necessary for the vehicle 102 to have all of the elements shown in FIG. 1. The vehicle 102 can have any combination of the various elements shown in FIG. 1. Further, the vehicle 102 can have additional elements to those shown in FIG. 1. In some arrangements, the vehicle 102 may be implemented without one or more of the elements shown in FIG. 1. While the various elements are shown as being located within the vehicle 102 in FIG. 1, it will be understood that one or more of these elements can be located external to the vehicle 102. Further, the elements shown may be physically separated by large distances. For example, as discussed, one or more components of the disclosed system can be implemented within a vehicle while further components of the system can be implemented within a cloud-computing environment.

Some of the possible elements of the vehicle 102 are shown in FIG. 1 and will be described along with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, as illustrated in the embodiment of FIG. 1, the vehicle 102 includes a vehicle sneeze control system 100 that is implemented to perform methods and other functions as disclosed herein relating to controlling a vehicle system when the vehicle system is under control of a user and the user is having a sneezing episode. As an example, the vehicle sneeze control system 100, in various embodiments, may be implemented partially within the vehicle 102 and may further exchange communications with additional aspects of the vehicle sneeze control system 100 that are remote from the vehicle 102 in support of the disclosed functions. Thus, while FIG. 2 generally illustrates the vehicle sneeze control system 100 as being self-contained, in various embodiments, the vehicle sneeze control system 100 may be implemented within multiple separate devices some of which may be remote from the vehicle 102.

Figure 2:
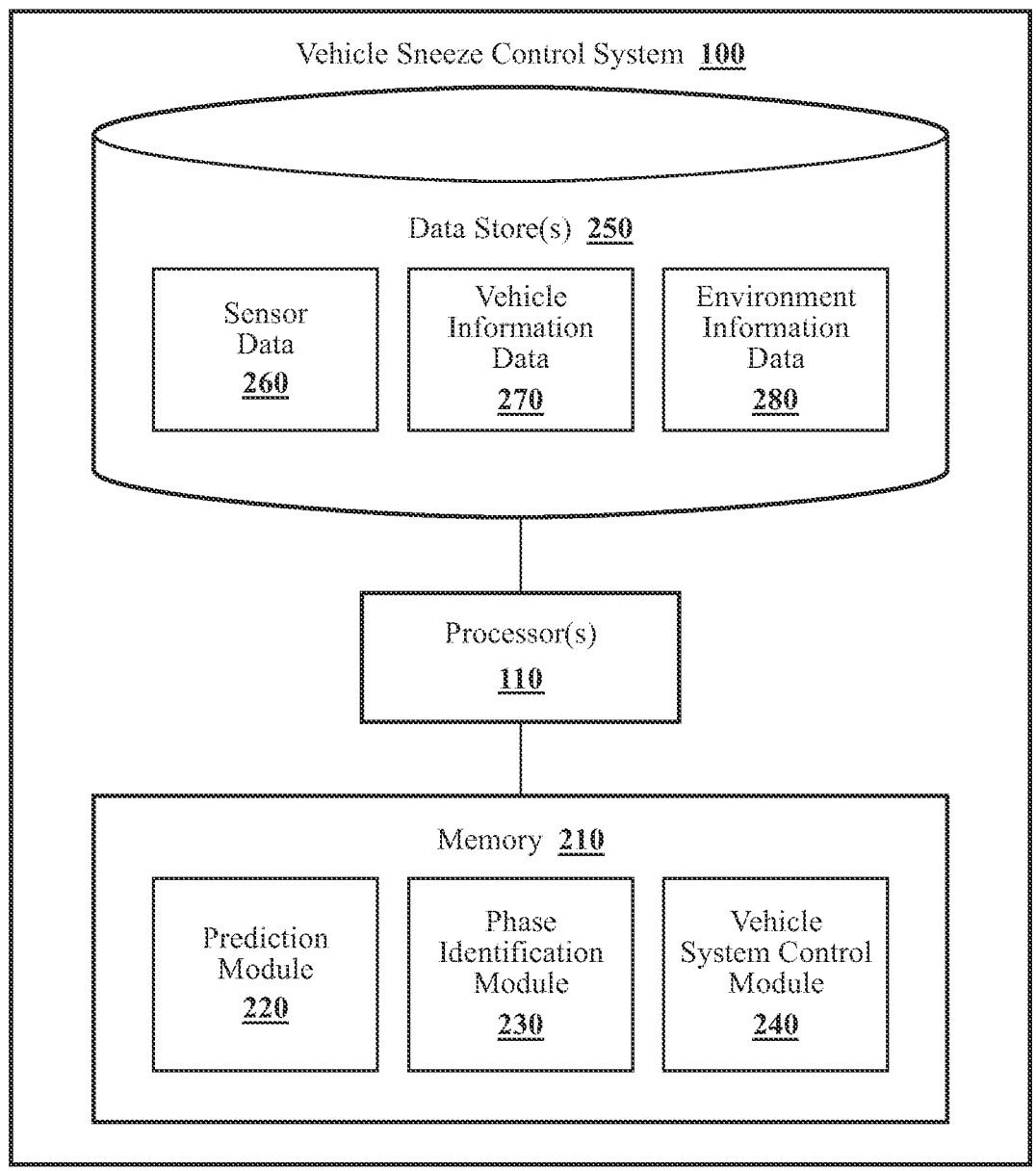
FIG. 2 is a more detailed block diagram of the vehicle sneeze control system of FIG. 1.

With reference to FIG. 2, a more detailed block diagram of the vehicle sneeze control system 100 is shown. The vehicle sneeze control system 100 may include a processor(s) 110. Accordingly, the processor(s) 110 may be a part of the vehicle sneeze control system 100, or the vehicle sneeze control system 100 may access the processor(s) 110 through a data bus or another communication pathway. In one or more embodiments, the processor(s) 110 is an application-specific integrated circuit that may be configured to implement functions associated with a prediction module 220, a phase identification module 230, and/or a vehicle system control module 240. More generally, in one or more aspects, the processor(s) 110 is an electronic processor, such as a microprocessor that can perform various functions as described herein when loading the modules 220-240 and executing encoded functions associated therewith.

The vehicle sneeze control system 100 may include a memory 210 that stores the prediction module 220, the phase identification module 230, and the vehicle system control module 240. The memory 210 may be a random-access memory (RAM), read-only memory (ROM), a hard disk drive, a flash memory, or other suitable memory for storing the modules 220-240. The modules 220-240 are, for example, computer-readable instructions that, when executed by the processor(s) 110, cause the processor(s) 110 to perform the various functions disclosed herein. While, in one or more embodiments, the modules 220-240 are instructions embodied in the memory 210, in further aspects, the modules 220-240 include hardware, such as processing components (e.g., controllers), circuits, etc. for independently performing one or more of the noted functions.

The vehicle sneeze control system 100 may include a data store(s) 250 for storing one or more types of data. Accordingly, the data store(s) 250 may be a part of the vehicle sneeze control system 100, or the vehicle sneeze control system 100 may access the data store(s) 250 through a data bus or another communication pathway. The data store(s) 250 is, in one embodiment, an electronically based data structure for storing information. In at least one approach, the data store 250 is a database that is stored in the memory 210 or another suitable medium, and that is configured with routines that can be executed by the processor(s) 110 for analyzing stored data, providing stored data, organizing stored data, and so on. In either case, in one embodiment, the data store 250 stores data used by the modules 220-240 in executing various functions. In one embodiment, the data store 250 may be able to store sensor data 260, vehicle information data 270, environment information data 280, and/or other information that is used by the modules 220-240.

The data store(s) 250 may include volatile and/or non-volatile memory. Examples of suitable data stores 250 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 250 may be a component of the processor(s) 110, or the data store(s) 250 may be operatively connected to the processor(s) 110 for use thereby. The term "operatively connected" or "in communication with" as used throughout this description, can include direct or indirect connections, including connections without direct physical contact.

In one or more arrangements, the data store(s) 250 can include sensor data 260. The sensor data 260 can originate from the sensor system 120 of the vehicle 102. The sensor data 260 can include data from visual sensors, audio sensors, and/or any other suitable sensors in the vehicle 102.

In one or more arrangements, the data store(s) 250 can include vehicle information data 270. The vehicle information data 270 can include driver information such as user identification and user history. The user history can include the user's physiology and user's driving style. The user's physiology can include allergens that the user reacts to such as pollen, dust or bright light, the manner in which the user reacts such sneezing, and the characteristics of the user's sneeze reflex such as the user's behavior at the start of a sneeze, the length of time the user spends in the initial inspiratory phase, the length of time the user spends in the expiratory phase, whether the user has multiple sneezes in quick succession. The user's driving style can include whether the user is light-footed or heavy footed on the brake pedal and/or the acceleration pedal, whether the user makes sharp turns, gradual turns, sudden turns, or slow turns when steering.

The vehicle information data 270 include information about the control mode that the vehicle 102 is in. As an example, the vehicle 102 can be in a non-autonomous mode, a semi-autonomous mode, or an autonomous mode. As another example, one or more of the vehicle systems 140 in the vehicle 102 can be at varying levels of manual or autonomous control. In such an example, one or more of the steering system 143, the throttle system 144, and/or the braking system 142 can be under manual control, autonomous control, or somewhere in between.

In one or more arrangements, the data store(s) 250 can include environment information data 280. The environment information data 280 may include information about the environment surrounding the vehicle 102 such as the location and condition of the path that the vehicle is travelling on. The location of the path(s) may include geographic coordinates of the path and the position of the path relative to a destination. The condition of the path may include traffic levels on the path as well as traffic rules based on the jurisdiction at the location of the path. The condition of the path can include information about the physical condition of the path such as the presence of potholes, road debris, vegetation, occlusions and/or the presence of road delineators such as lane markers, road edge markers, traffic signs, traffic lights, and communicative roadside units. The location, dimensions and conditions of the path can be described as the path type.

Additionally and/or alternatively, the environment information data 280 can include conditions in the environment such as a weather condition, a road condition, air quality, light levels, and/or a timestamp. A weather condition may include, as an example, presence of precipitation such as snow, rain, and/or hail. The weather condition may further include impacts of weather such as fog levels, fallen snow levels (i.e. the amount of snow on the ground), and/or flooding. The air quality may include dust and/or pollen levels in the air. The light levels may include the brightness of light inside and/or around the vehicle. The environment information data 280 may be updated periodically and/or on-demand. The sensor data 260, the vehicle information data 270, and the environment information data 280 may be digital data that describe information used by the vehicle sneeze control system 100 to control a vehicle system 140.

In one embodiment, the prediction module 220 may include instructions that, when executed by the processor(s) 110, cause the processor(s) 110 to predict a start of a user sneezing episode. As an example, the prediction module 220 can further include instructions that, when executed by the processor(s) 110, cause the processor(s) 110 to predict the start of the user sneezing episode based on one or more of a visual cue, an audio cue, and an environmental condition.

The prediction module 220 may receive sensor data 260 and/or environment information data 280 from the data store(s) 250. As previously mentioned, the prediction module 220 can determine the start of the user sneezing episode based on a visual cue. As an example, the prediction module 220 may receive sensor data 260 that shows the positioning of the user's head, face, and hands, as well as the expression on the user's face. The prediction module 220 may determine based on the received sensor data 260 whether the user is about to sneeze. As an example, the prediction module 220 may determine that the user is about to sneeze if the sensor data 260 shows the user's head tilting back, mouth opening, eyes closing or squinting, and/or the user's hand moving towards the user's face.

As previously mentioned, the prediction module 220 can determine the start of the user sneezing episode based on an audio cue. As an example, the prediction module 220 may receive sensor data 260 that includes sounds made in the vehicle cabin. The prediction module 220 may determine based on the received sensor data 260 whether the user is about to sneeze. As an example, the prediction module 220 may determine that the user is about to sneeze if the sensor data 260 includes an inhaling sound and/or a sound associated with sneezing such as an "ah!" sound.

As previously mentioned, the prediction module 220 can determine the start of the user sneezing episode based on an environmental condition. As an example, the prediction module 220 may receive environment information data 280 that includes air quality and light levels in and/or surrounding the vehicle 102. The prediction module 220 may determine based on the received environment information data 280 whether the user is about to sneeze. In one embodiment, the prediction module 220 may determine whether the user is about to sneeze using, as an example, a combination of dust and/or pollen levels in the air, brightness of the light, the user's historical response to the dust, pollen, and light levels, visual cues, and audio cues. In another embodiment, the prediction module 220 may use the received environment information data 280 to determine whether the conditions that may trigger the user sneezing episode are present, and may begin to monitor for the visual and audio cues when those conditions are present. As an alternative, the prediction module 220 may monitor for the visual and/or audio cues whether the prediction module 220 has determined the conditions that may trigger the user sneezing episode are present or not. The prediction module 220 can use any suitable algorithm such as a machine learning algorithm or an artificial intelligence process to predict the start of the user sneezing episode. In addition and/or as an alternative, the prediction module 220 can use the user history to predict the start of the user sneezing episode.

In one embodiment, the phase identification module 230 may include instructions that, when executed by the processor(s) 110, cause the processor(s) 110 to identify a plurality of phases in the user sneezing episode. The plurality of phases can include one or more of an inspiratory phase, an expiratory phase, a waiting phase, and a normal phase. The inspiratory phase of the user sneezing episode occurs when the user inhales and is related to the initial spasmodic inspiratory phase of the sneeze reflex. The expiratory phase of the user sneezing episode occurs when the user exhales and is related to the oral and nasal expiratory phase of the sneeze reflex. The waiting phase of the user sneezing episode occurs after the expiratory phase. The waiting phase is a waiting period between the end of the sneeze and a return to normal, sneeze-free, driving mode. The duration of the waiting phase can vary and can be set to any suitable time period including a zero time period. The normal phase is where the user is not sneezing and is capable of operating the vehicle.

As an example, the phase identification module 230 can receive a signal from the prediction module 220 indicating the start of the user sneezing episode and the phase identification module 230 can monitor for the phases of the user sneezing episode using the sensor data 260. The phase identification module 230 can use visual cues and/or audio cues to identify the phases. As an example of using visual and audio cues, the phase identification module 230 can identify the inspiratory phase when the sensor data 260 shows the user with eyes closed, mouth open, and making a sound indicative of breathing in such as "ah!". In such an example, the phase identification module 230 can identify the expiratory phase when the sensor data 260 shows the user with eyes closed, mouth open, and making a sound indicative of breathing out such as "choo!". The phase identification module 230 can identify the waiting phase based on the end of the expiratory phase and the time period allocated to the waiting phase. The phase identification module can identify the normal phase based on the end of the waiting phase and when there is no signal from the prediction module 220 indicating the start of the user sneezing episode.

The phase identification module 230 can use any suitable algorithm such as a machine learning algorithm or an artificial intelligence process to identify the phases of the user sneezing episode. In addition, and/or as an alternative, the phase identification module 230 can use the user history to identify the phases in the user sneezing episode. The phase identification module 230 can output a phase signal that indicates which of the phases in the user sneezing episode is active to the vehicle system control module 240.

In one embodiment, the vehicle system control module 240 may include instructions that, when executed by the processor(s) 110, cause the processor(s) 110 to control the vehicle system 140 based on which one of the phases is active. As an example, the vehicle system control module 240 can receive the start signal from the prediction module 220 indicating the start of the user sneezing episode, and can receive the phase signal from the phase identification module 230 indicating which phase of the user sneezing episode is active. The vehicle system control module 240 can determine the user's shortcomings in one or more phases and control the vehicle system 140 to compensate for the shortcomings. As an example, the vehicle system control module 240 can determine that the user's eyes are open during the inspiratory phase and the user's eyes are closed during the expiratory phase based on sensor data 260 and/or user history. In response, the vehicle system control module 240 can activate or increase the sensitivity of vehicle environment sensors during the expiratory phase to compensate for the user's eyes being closed. The vehicle system control module 240 can deactivate or decrease the sensitivity of the vehicle environment sensors 122 in the waiting phase or in the normal phase.

The vehicle system control module 240 can further include instructions that, when executed by the processor(s) 110, cause the processor(s) 110 to control the vehicle system 140 based on one or more of vehicle speed, vehicle location, relative location of the vehicle 102, hand-wheel position, hand-wheel rotation speed, an object adjacent to the vehicle 102, and confidence in sneezing prediction. Additionally, and/or alternatively, the vehicle system control module 240 can control the vehicle system 140 based on one or more of user history, user driving style and/or environment information data 280. As previously mentioned, the vehicle system control module 240 can control one or more of the steering system 143, the throttle system 144, and the braking system 142. The vehicle system control module 240 can control, activate, or deactivate the vehicle system(s) 140 in one or more of the phases when the phase is active.

As an example, the vehicle system control module 240 can decouple the steering wheel from the steering rack in the expiratory phase. As another example, the vehicle system control module 240 can adjust the damping coefficient between the steering wheel and the steering rack. In such an example, the vehicle system control module 240 can increase the damping coefficient in the expiratory phase such that a clockwise or counterclockwise jerk of the steering wheel is absorbed by the damper between the steering wheel and the steering rack, and does not affect the steering rack. As another example, the vehicle system control module 240 can lower the gain of the steering wheel. In such an example, a 30 degree turn of the steering wheel may result in a 10 degree turn of the steering rack. As another example, the vehicle system control module 240 can adjust a smoothing coefficient between the steering wheel and the steering rack. The smoothing coefficient can smooth out an input such as the rate of change and/or the degree of change. The rate of change can be the rate at which the user turns the steering wheel. In such a case, the vehicle system control module 240 can use the smoothing coefficient to average out the rate at which the steering rack turns in response to the steering wheel based on previous rates of change. The degree of change can be the steering angle measurement. In such a case, the vehicle system control module 240 can use the smoothing coefficient to average the angle that the steering rack turns in response to the steering wheel based on previous degrees of change.

As an example, the vehicle system control module 240 can decouple the accelerator pedal from the throttle in the inspiratory phase. As another example, the vehicle system control module 240 can decouple the braking pedal from the braking actuators. Similar to the steering system 143 as described above, the vehicle system control module 240 can adjust the damping coefficient between the accelerator pedal and the throttle, and/or between the braking pedal and the braking actuators. In such examples, the vehicle system control module 240 can increase the damping coefficient such that an input such as a depression of the accelerator pedal or the brake pedal is absorbed by the damper such that the response by the throttle or the braking actuators respectively is minimal. As another example and similar to the steering system 143, the vehicle system control module 240 can lower the gain of the input to the throttle system 144 and/or the braking system 142. As another example, the vehicle system control module 240 can adjust a smoothing coefficient between the input unit and the functional unit for the throttle system 144 and/or the braking system 142.

The vehicle system control module 240 can further include instructions that, when executed by the processor(s) 110, cause the processor(s) 110 to control the vehicle system in a first mode when one of the phases is active, and control the vehicle system 140 in a second mode when another of the phases is active. In such a case, the first mode is different from the second mode. As an example, the vehicle system control module 240 can adjust the damping coefficient between the accelerator pedal and the throttle to a first value in the inspiratory phase, a second value in the expiratory phase, a third value in the waiting phase, and a fourth value in the normal phase.

The vehicle system control module 240 can assume control of one or more vehicle systems 140 in one phase and not assume control of the one or more vehicle systems 140 in another phase. As another example, the vehicle system control module 240 can assume control of the vehicle systems 140 in one phase at a first level of involvement or intensity and assume control of the vehicle systems 140 in another phase at a second level of involvement or intensity.

As an example, the vehicle system control module 240 can switch the driving mode of the vehicle 102. In such an example, the vehicle system control module 240 can switch the vehicle 102 to a semi-autonomous mode in one phase and to a fully autonomous mode in another phase. Similarly, the vehicle system control module 240 can activate, deactivate, and/or adjust the parameters of any suitable driver assistance systems. As an example, the vehicle system control module 240 can adjust the parameters of a lane centering assistance system by narrowing or widening the center lane region. As another example, the vehicle system control module 240 can adjust the parameters of the lane keeping assistance system such that the lane keeping assistance system can more gradually or more sharply, based on time and/or applied force, keep the vehicle within the lane edges.

Figure 3:
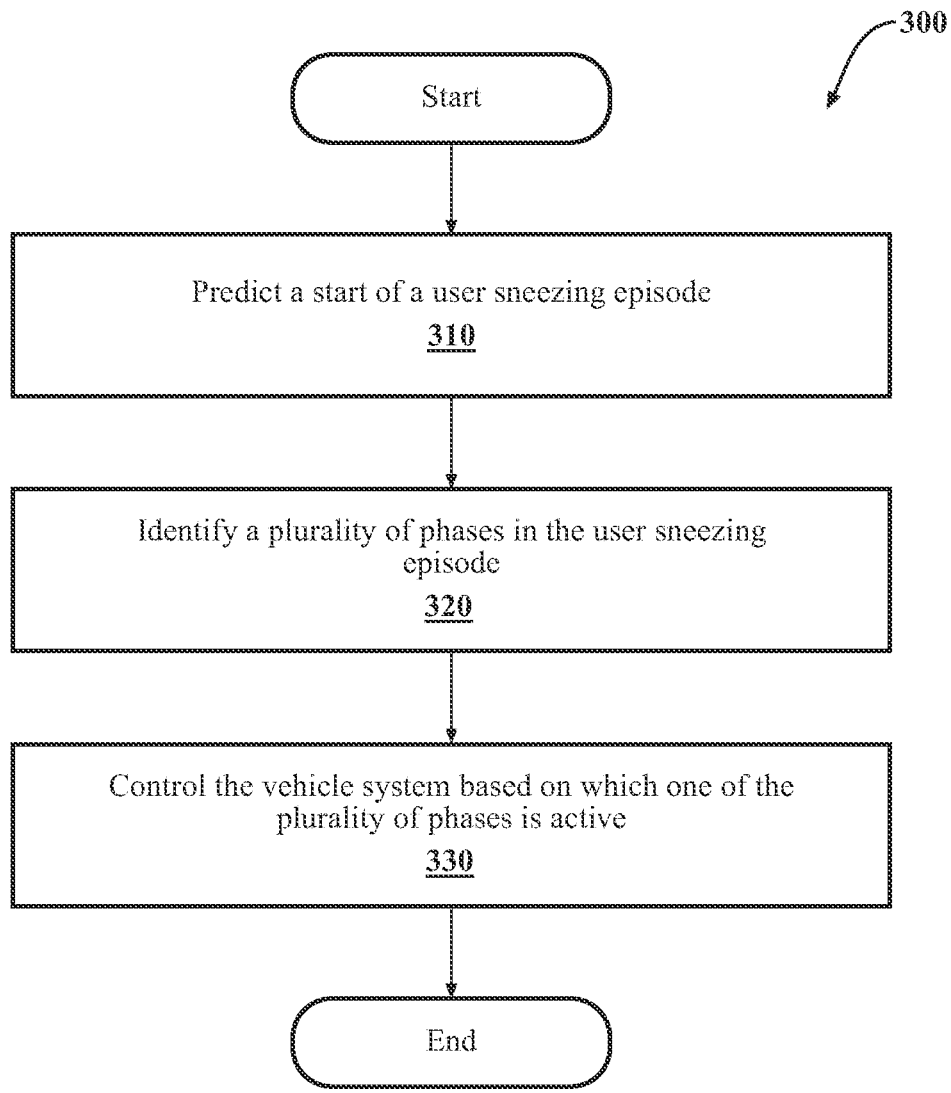
FIG. 3 is an example of a method for controlling a vehicle system when the vehicle system is under control of a user.

FIG. 3 illustrates a method 300 for controlling a vehicle system 140 when the vehicle system 140 is under control of a user. The method 300 will be described from the viewpoint of the vehicle 102 of FIG. 1 and the vehicle sneeze control system of FIG. 2. However, the method 300 may be adapted to be executed in any one of several different situations and not necessarily by the vehicle of FIG. 1 and/or the vehicle sneeze control system of FIG. 2.

At step 310, the prediction module 220 may cause the processor(s) 110 to predict a start of a user sneezing episode. As previously mentioned, the prediction module 220 may predict the start of the user sneezing episode based on sensor data 260, vehicle information data 270, and/or environment information data 280. The prediction module 220 may output a start signal indicating the start of the user sneezing episode.

At step 320, the phase identification module 230 may cause the processor(s) 110 to identify a plurality of phases in the user sneezing episode. As an example, the phase identification module 230 can receive the start signal indicating the start of the user sneezing episode, and then identify the phases of the user sneezing episode based on the sensor data 260 as described above. The phase identification module 230 may output a phase signal indicating which of the phases is currently active.

At step 330, the vehicle system control module 240 may cause the processor(s) 110 to control the vehicle system 140 based on which one of the phases is active. As previously mentioned, the vehicle system control module 240 can control one or more vehicle systems 140 such as a steering system 143, a throttle system 144, a braking system 142, a driver assistance system, and/or an autonomous driving system 160.

Figure 4:
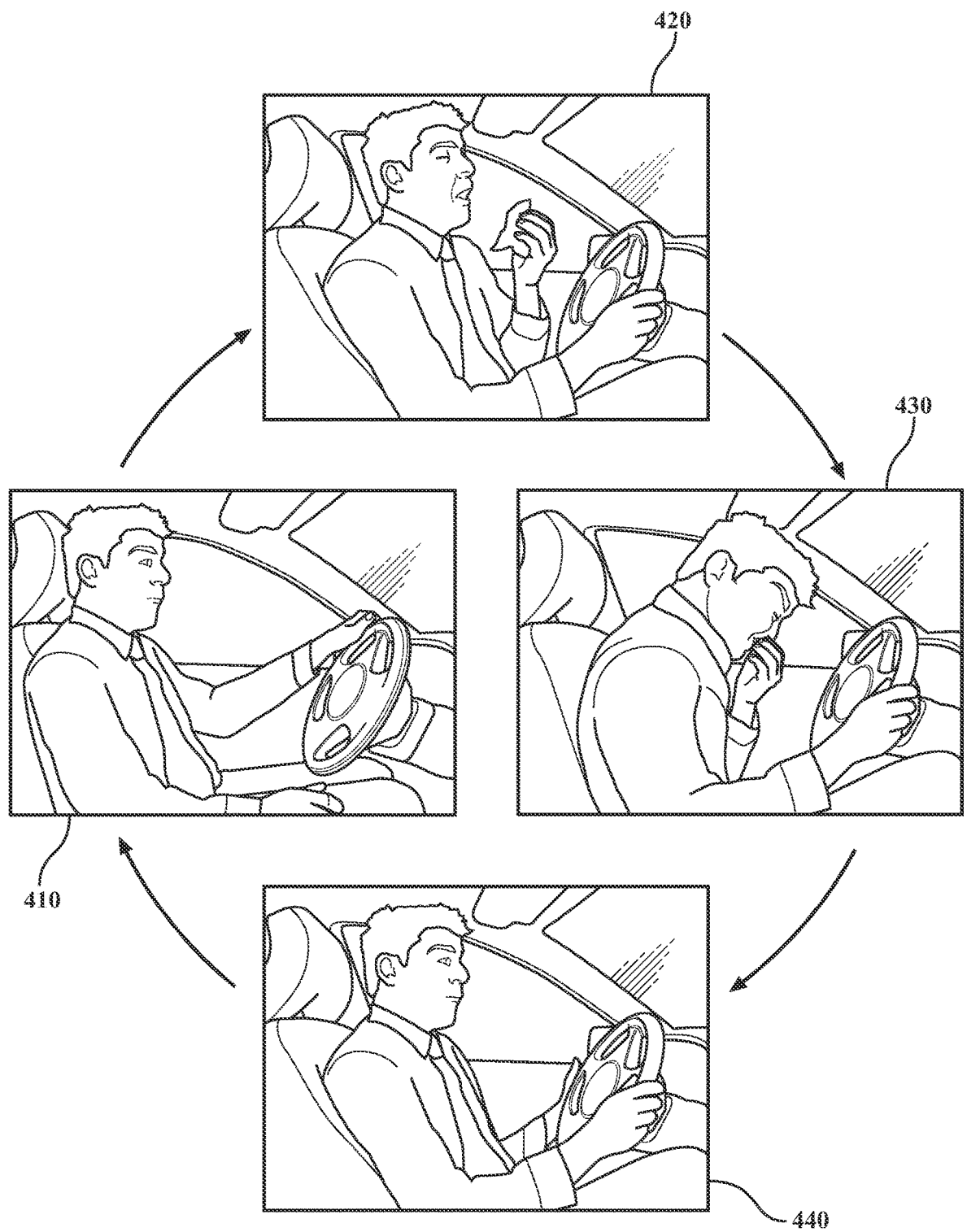
FIG. 4 is an example of a vehicle sneeze control scenario.

A non-limiting example of the operation of the vehicle sneeze control system 100 in the multiple phases of a user sneezing episode, and/or one or more of the methods will now be described in relation to FIG. 4. FIG. 4 shows an example of a vehicle sneeze control scenario.

FIG. 4 shows a user driving a vehicle 102. The vehicle 102 includes driver assistance systems such as a lane keeping system and a collision avoidance system, which are currently deactivated. As shown, in a normal phase 410 of the user sneezing episode, the user is not sneezing and is operating the vehicle 102 and/or one or more vehicle systems 140. The vehicle sneeze control system 100 is not controlling the vehicle 102 and/or one or more vehicle systems 140.

In the normal phase 410, one or more sensors, such as a camera 126, an audio sensor 127, and an air quality sensor 128, are monitoring the objects and/or events inside the vehicle 102. The vehicle sneeze control system 100, or more specifically, the prediction module 220 can periodically assess the sensor data 260 received from the sensors to determine whether the start of a user sneezing episode has been detected. As an example and as shown, the prediction module 220 can determine the start of a user sneezing episode based on sensor data 260 indicating that the user's head is tilted back, the user's eyes are closed, the user's mouth is open, and the user has vocalized the sound "ah!". The prediction module 220 can then output a start signal indicating the start of the user sneezing episode.

The vehicle sneeze control system 100, or more specifically, the phase identification module 230 can receive the start signal from the prediction module 220 and can determine, based on the sensor data 260 indicating that the user's head is tilted back, the user's eyes are closed, the user's mouth is open, and the user has vocalized the sound "ah!", that the current phase of the sneezing episode is the inspiratory phase 420. The phase identification module 230 can output a phase signal indicating that the current phase is the inspiratory phase 420. In the inspiratory phase 420 and as an example, the vehicle system control module 240 can activate the previously deactivated lane keeping system based on sensor data 260, vehicle information data 270, and/or environment information data 280.

The phase identification module 230 can determine, based on the sensor data 260 indicating that the user's head is tilted forward, the user's eyes are closed, the user's mouth is pursed, and the user has vocalized the sound "choo!", that the current phase of the sneezing episode is the expiratory phase 430. The phase identification module 230 can output a phase signal indicating that the current phase is the expiratory phase 430. In the expiratory phase 430 and as an example, the vehicle system control module 240 can activate the previously deactivated collision avoidance system based on sensor data 260, vehicle information data 270, and/or environment information data 280.

The phase identification module 230 can determine, based on the sensor data indicating that the user's head is upright, the user's eyes are open and are facing the road, and the user's mouth is closed, that the current phase of the sneezing episode is the waiting phase 440. As an example, the phase identification module 230 can remain in the waiting phase 440 for five seconds. The phase identification module 230 can output a phase signal indicating that the current phase is the waiting phase 440. In the waiting phase 440 and as an example, the vehicle system control module 240 can keep the lane keeping system and the collision avoidance system activated based on sensor data 260, vehicle information data 270, and/or environment information data 280.

The phase identification module 230 can determine, at the expiration of the five seconds in the waiting phase 440, that the current phase of the sneezing episode is the normal phase 410. The phase identification module 230 can output a phase signal indicating that the current phase is the normal phase 410. In the normal phase 410 and as an example, the vehicle system control module 240 can deactivate the lane keeping system and the collision avoidance system, returning to vehicle systems 140 to their settings before the user sneezing episode.

FIG. 1 will now be discussed in full detail as an example environment within which the system and methods disclosed herein may operate. In some instances, the vehicle 102 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 102 can be a conventional vehicle that is configured to operate in only a manual mode.

In one or more embodiments, the vehicle 102 is an autonomous vehicle. As used herein, "autonomous vehicle" refers to a vehicle that operates in an autonomous mode. "Autonomous mode" refers to navigating and/or maneuvering the vehicle 102 along a travel route using one or more computing systems to control the vehicle 102 with minimal or no input from a human driver. In one or more embodiments, the vehicle 102 is highly automated or completely automated. In one embodiment, the vehicle 102 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 102 along a travel route.

The vehicle 102 can include one or more processors 110. In one or more arrangements, the processor(s) 110 can be a main processor of the vehicle 102. For instance, the processor(s) 110 can be an electronic control unit (ECU). The vehicle 102 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 260-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

The one or more data stores 115 can include sensor data 119. In this context, "sensor data" means any information about the sensors that the vehicle 102 is equipped with, including the capabilities and other information about such sensors. As will be explained below, the vehicle 102 can include the sensor system 120. The sensor data 119 can relate to one or more sensors of the sensor system 120. As an example, in one or more arrangements, the sensor data 119 can include information on one or more vehicle sensors 121 and/or environment sensors 122 of the sensor system 120.

In some instances, at least a portion of the map data 116 and/or the sensor data 119 can be located in one or more data stores 115 located onboard the vehicle 102. Alternatively, or in addition, at least a portion of the map data 116 and/or the sensor data 119 can be located in one or more data stores 115 that are located remotely from the vehicle 102.

As noted above, the vehicle 102 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 102 (including any of the elements shown in FIG. 1). The sensor system 120 can acquire data of at least a portion of the internal environment as well as the external environment of the vehicle 102 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 102 itself. In one or more arrangements, the vehicle sensor(s) 121 can be configured to detect, and/or sense position and orientation changes of the vehicle 102, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 102. In one or more arrangements, the vehicle sensor(s) 121 can include a speedometer to determine a current speed of the vehicle 102.

Alternatively, or in addition, the sensor system 120 can include one or more environment sensors 122 configured to acquire, and/or sense data inside the vehicle as well as around the vehicle. Sensor data inside the vehicle can include information about one or more users in the vehicle cabin and any other objects of interest. Sensor data around the vehicle can include information about the external environment in which the vehicle is located or one or more portions thereof.

As an example, the one or more environment sensors 122 can be configured to detect, quantify and/or sense objects in at least a portion of the internal and/or the external environment of the vehicle 102 and/or information/data about such objects.

In the internal environment of the vehicle 102, the one or more environment sensors 122 can be configured to detect, measure, quantify, and/or sense human users inside the vehicle 102 and the facial expressions of the users. In the external environment, the one or more environment sensors 122 can be configured to detect, measure, quantify, and/or sense objects in the external environment of the vehicle 102, such as, for example, lane markers, signs, traffic lights, traffic signs, lane lines, crosswalks, curbs proximate the vehicle 102, off-road objects, electronic roadside devices, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, one or more cameras 126, and/or one or more audio sensors 127. In one or more arrangements, the one or more cameras 126 can be high dynamic range (HDR) cameras or infrared (IR) cameras. The audio sensor(s) 127 can be microphones and/or any suitable audio recording devices. Any sensor in the sensor system 120 that is suitable for detecting and observing humans and/or human facial expression can be used inside the vehicle 102 to observe the users. Additionally, the sensor system 120 can include one or more air quality sensors 128 for detecting allergens such as pollen, dust, and/or fur in the air inside the vehicle. The sensor system 120 can include one or more light sensors 129 for measuring light levels inside the vehicle.

The vehicle 102 can include an input system 130. An "input system" includes any device, component, system, element or arrangement or groups thereof that enable information/data to be entered into a machine. The input system 130 can receive an input from a user (e.g., a driver or a passenger). The vehicle 102 can include an output system 135. An "output system" includes any device, component, or arrangement or groups thereof that enable information/data to be presented to a user (e.g., a person, a vehicle passenger, etc.) such as a display interface.

The vehicle 102 can include one or more vehicle systems 140. Various examples of the one or more vehicle systems 140 are shown in FIG. 1. However, the vehicle 102 can include more, fewer, or different vehicle systems 140. It should be appreciated that although particular vehicle systems are separately defined, each or any of the systems or portions thereof may be otherwise combined or segregated via hardware and/or software within the vehicle 102. The vehicle 102 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 102 and/or to determine a travel route for the vehicle 102. The navigation system 147 can include one or more mapping applications to determine a travel route for the vehicle 102. The navigation system 147 can include a global positioning system, a local positioning system or a geolocation system.

The vehicle 102 can include one or more autonomous driving systems 160. The autonomous driving system 160 can include one or more devices, applications, and/or combinations thereof, now known or later developed, configured to control the movement, speed, maneuvering, heading, direction, etc. of the vehicle 102. The autonomous driving system 160 can include one or more driver assistance systems such as a lane keeping system, a lane centering system, a collision avoidance system, and/or a driver monitoring system.

The autonomous driving system(s) 160 can be configured to receive data from the sensor system 120 and/or any other type of system capable of capturing information relating to the vehicle 102 and/or the external environment of the vehicle 102. In one or more arrangements, the autonomous driving system(s) 160 can use such data to generate one or more driving scene models. The autonomous driving system(s) 160 can determine position and velocity of the vehicle 102. The autonomous driving system(s) 160 can determine the location of obstacles, obstacles, or other environmental features including traffic signs, trees, shrubs, neighboring vehicles, pedestrians, etc.

The autonomous driving system(s) 160 can be configured to receive, and/or determine location information for obstacles within the external environment of the vehicle 102 for use by the processor(s) 110, and/or one or more of the modules described herein to estimate position and orientation of the vehicle 102, vehicle position in global coordinates based on signals from a plurality of satellites, or any other data and/or signals that could be used to determine the current state of the vehicle 102 or determine the position of the vehicle 102 with respect to its environment for use in either creating a map or determining the position of the vehicle 102 in respect to map data.

The autonomous driving system(s) 160 either independently or in combination with the vehicle sneeze control system 100 can be configured to determine travel path(s), current autonomous driving maneuvers for the vehicle 102, future autonomous driving maneuvers and/or modifications to current autonomous driving maneuvers based on data acquired by the sensor system 120, driving scene models, and/or data from any other suitable source such as determinations from the sensor data 119. "Driving maneuver" means one or more actions that affect the movement of a vehicle. Examples of driving maneuvers include accelerating, decelerating, braking, turning, moving in a lateral direction of the vehicle 102, changing travel lanes, merging into a travel lane, and/or reversing, just to name a few possibilities. The autonomous driving system(s) 160 can be configured to implement determined driving maneuvers. The autonomous driving system(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving system(s) 160 can be configured to execute various vehicle functions and/or to transmit data to, receive data from, interact with, and/or control the vehicle 102 or one or more systems thereof (e.g., one or more of vehicle systems 140).

The processor(s) 110, the vehicle sneeze control system 100, and/or the autonomous driving system(s) 160 can be operatively connected to communicate with the various vehicle systems 140 and/or individual components thereof. For example, returning to FIG. 1, the processor(s) 110, the vehicle sneeze control system 100, and/or the autonomous driving system(s) 160 can be in communication to send and/or receive information from the various vehicle systems 140 to control the movement, speed, maneuvering, heading, direction, etc. of the vehicle 102. The processor(s) 110, the vehicle sneeze control system 100, and/or the autonomous driving system(s) 160 may control some or all of these vehicle systems 140 and, thus, may be partially or fully autonomous.

The processor(s) 110, the vehicle sneeze control system 100, and/or the autonomous driving system(s) 160 may be operable to control the navigation and/or maneuvering of the vehicle 102 by controlling one or more of the vehicle systems 140 and/or components thereof. As an example, when operating in an autonomous mode, the processor(s) 110, the vehicle sneeze control system 100, and/or the autonomous driving system(s) 160 can control the direction and/or speed of the vehicle 102. As another example, the processor(s) 110, the vehicle sneeze control system 100, and/or the autonomous driving system(s) 160 can activate, deactivate, and/or adjust the parameters (or settings) of the one or more driver assistance systems. The processor(s) 110, the vehicle sneeze control system 100, and/or the autonomous driving system(s) 160 can cause the vehicle 102 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 102 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving system(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 102 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4 but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method for controlling a vehicle system when the vehicle system is under control of a user, the method comprising the steps of:
predicting a start of a user sneezing episode;
identifying a plurality of phases in the user sneezing episode, the plurality of phases including at least three phases; and
controlling the vehicle system based on which one of the plurality of phases is active.

2. The method of claim 1, wherein the vehicle system includes an input unit for human-machine interaction and a functional unit that mechanically controls one of vehicle speed, acceleration and braking, wherein the input unit is decoupled from the functional unit by a mechanism that is at least one of an electrical, electronic, or electromechanical system.

3. The method of claim 1, wherein the vehicle system is one or more of a steering system, a throttle system, and a braking system.

4. The method of claim 1, wherein predicting the start of the user sneezing episode is based on one or more of a visual cue, an audio cue, and an environmental condition.

5. The method of claim 1, wherein the plurality of phases includes one or more of an inspiratory phase, an expiratory phase, a waiting phase, and a normal phase.

6. The method of claim 1, further comprising:
controlling the vehicle system based on one or more of vehicle speed, vehicle location, relative location of vehicle, hand-wheel position, hand-wheel rotation speed, an object adjacent to vehicle, and confidence in sneezing prediction.

7. The method of claim 1, further comprising:
controlling the vehicle system in a first mode when one of the plurality of phases is active, and
controlling the vehicle system in a second mode when an other of the plurality of phases is active, wherein the first mode is different from the second mode.

8. The method of claim 7, wherein the first mode and the second mode differ based on one or more of function, intensity, and length of time.

9. A system for controlling a vehicle system when the vehicle system is under control of a user, the system comprising:
a processor; and
a memory in communication with the processor, the memory including:
a prediction module having instructions that, when executed by the processor, cause the processor to predict a start of a user sneezing episode,
a phase identification module having instructions that, when executed by the processor, cause the processor to identify a plurality of phases in the user sneezing episode, the plurality of phases including at least three phases, and
a vehicle system control module having instructions that, when executed by the processor, cause the processor to control the vehicle system based on which one of the plurality of phases is active.

10. The system of claim 9, wherein the vehicle system includes an input unit and a functional unit, wherein the input unit is decoupled from the functional unit.

11. The system of claim 9, wherein the vehicle system is one or more of a steering system, a throttle system, and a braking system.

12. The system of claim 9, wherein the prediction module further includes instructions that when executed by the processor cause the processor to predict the start of the user sneezing episode based on one or more of a visual cue, an audio cue, and an environmental condition.

13. The system of claim 9, wherein the plurality of phases includes one or more of an inspiratory phase, an expiratory phase, a waiting phase, and a normal phase.

14. The system of claim 9, wherein the vehicle system control module further includes instructions that when executed by the processor cause the processor to control the vehicle system based on one or more of vehicle speed, vehicle location, relative location of vehicle, hand-wheel position, hand-wheel rotation speed, an object adjacent to vehicle, and confidence in sneezing prediction.

15. The system of claim 9, wherein the vehicle system control module further includes instructions that when executed by the processor cause the processor to control the vehicle system in a first mode when one of the plurality of phases is active, and control the vehicle system in a second mode when an other of the plurality of phases is active, wherein the first mode is different from the second mode.

16. The system of claim 15, wherein the first mode and the second mode differ based on one or more of function, intensity, and length of time.

17. A non-transitory computer-readable medium for controlling a vehicle system when the vehicle system is under control of a user and including instructions that when executed by a processor cause the processor to:
predict a start of a user sneezing episode;
identify a plurality of phases in the user sneezing episode, the plurality of phases including at least three phases; and
control the vehicle system based on which one of the plurality of phases is active.

18. The non-transitory computer-readable medium of claim 17, wherein the vehicle system includes an input unit and a functional unit, wherein the input unit is decoupled from the functional unit.

19. The non-transitory computer-readable medium of claim 17, wherein the vehicle system is one or more of a steering system, a throttle system, and a braking system.

20. The non-transitory computer-readable medium of claim 17, wherein predicting the start of the user sneezing episode is based on one or more of a visual cue, an audio cue, and an environmental condition.

\* \* \* \* \*